(12) United States Patent
Matsumoto

(10) Patent No.: US 6,522,731 B2
(45) Date of Patent: Feb. 18, 2003

(54) DATA COMMUNICATION APPARATUS

(75) Inventor: Wataru Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/445,599

(22) PCT Filed: Apr. 1, 1999

(86) PCT No.: PCT/JP99/01719
§ 371 (c)(1),
(2), (4) Date: Dec. 13, 1999

(87) PCT Pub. No.: WO99/59782
PCT Pub. Date: Nov. 4, 1999

(65) Prior Publication Data
US 2002/0067811 A1 Jun. 6, 2002

(30) Foreign Application Priority Data
Apr. 24, 1998 (JP) .................................... 10-115288

(51) Int. Cl.[7] ............................................. H04M 11/00
(52) U.S. Cl. ............................... 379/93.08; 379/93.05; 379/93.28
(58) Field of Search ..................... 379/90.01, 93.08, 379/93.09, 93.05, 93.28, 93.31, 93.06, 252, 283; 370/210, 486, 487, 493, 494; 375/222, 219, 377

(56) References Cited

U.S. PATENT DOCUMENTS

| | | | |
|---|---|---|---|
| 5,479,447 A | | 12/1995 | Chow et al. |
| 5,781,728 A | | 7/1998 | Rybicki et al. |
| 5,852,633 A | | 12/1998 | Levin et al. |
| 6,061,392 A | * | 5/2000 | Bremer et al. ............... 370/494 |
| 6,072,779 A | * | 6/2000 | Tzannes et al. .............. 370/252 |
| 6,092,122 A | * | 7/2000 | Liu et al. ..................... 709/277 |
| 6,101,216 A | * | 8/2000 | Henderson et al. .......... 375/222 |
| 6,151,335 A | * | 11/2000 | Ko et al. ...................... 370/487 |
| 6,266,348 B1 | * | 7/2001 | Gross et al. ................. 370/493 |

FOREIGN PATENT DOCUMENTS

| | | |
|---|---|---|
| CH | 621 025 A | 12/1980 |
| EP | 0 653 873 A1 | 5/1995 |
| EP | 812087 | 10/1997 |
| EP | 0820168 | 1/1998 |
| GB | 2 303 032 A | 2/1997 |
| GB | 2303032 A | 2/1997 |
| JP | 59172851 | 9/1984 |
| JP | 60112357 | 6/1985 |
| JP | 60-112357 | 6/1985 |

(List continued on next page.)

OTHER PUBLICATIONS

Y. Kimura et al, Access Network Systems Laboratories, General Convention of Institute of Electronics, Information and Communication Engineers.
"Empirical Characterization of In–Home Telephone Wiring", AMD, D. 176 (WPI/15) ITU–T SG15, Geneva, 9–20.

Primary Examiner—Melur Ramakrishnaiah
(74) Attorney, Agent, or Firm—Birch, Stewart, Kolasch & Birch, LLP

(57) ABSTRACT

An on-hook/off-hook detection circuit (61) detects the voltage level of a telephone line C and thus detects whether the audio band communication using the telephone line C is in on-hook state or in off-hook state thereby to output a status detection signal (81). TEQ (63), FEQ (66) and a constellation encoder gain scaling (67), based on the particular status detection signal (81), conducts the data communication by the adaptive equalization, the bit allocation and the gain allocation in the time domain and the frequency domain using separate tables (75 to 80) for on-hook and off-hook states. In on-hook state where no telephone is used, the transmission subcarrier is extended or shifted up to the neighborhood of-the audio band and the communication is conducted using up to the audio band.

27 Claims, 7 Drawing Sheets

FOREIGN PATENT DOCUMENTS

| | | |
|---|---|---|
| JP | 548391 | 2/1993 |
| JP | 7327065 | 12/1995 |
| JP | 951328 | 2/1997 |
| JP | 9-275387 | 10/1997 |
| JP | 9275387 | 10/1997 |
| JP | 10154949 | 6/1998 |
| JP | 10155031 | 6/1998 |
| JP | 11308352 | 11/1999 |
| KR | 95-02588 | 3/1995 |
| WO | WO 99/20027 | 4/1999 |

* cited by examiner

(a)

SUBCARRIER INCREASED TO THE NEIGHBORHOOD OF AUDIO BAND

(b)

OPERATING BAND SHIFTED TO NEIGHBORHOOD OF AUDIO BAND (ABOUT 26 kHz)

(c)

SUBCARRIER INCREASED USING UP TO AUDIO BAND

RING FREQUENCY
15 TO 20Hz

ADSL (DMT SYSTEM) USING ECHO CANCELLER

DATA COMMUNICATION APPARATUS

This application is the national phase under 35 U.S.C. §371 of PCT International Application No. PCT/JP99/01719 which has an International filing date of Apr. 1, 1999 which designated the United States of America.

TECHNICAL FIELD

The present invention relates to a data communication apparatus which can perform data communication such as the xDSL scheme using the telephone line for audio band communication.

BACKGROUND ART

In recent years, the xDSL communication system such as the ADSL (Asymmetric Digital Subscriber Line) communication system, the HDSL (High-bitrate Digital Subscriber Line) communication system and the SDSL (Symmetric Digital Subscriber Line) communication system which can perform high-speed digital communication of several Mbits/sec using the existing telephone copper cable have been closely watched as a wired digital communication system. One of the line codes in the xDSL communication system such as the DMT (Discrete Multi-Tone) modem system, is standardized by T1.413 of ANSI.

FIG. 7 shows a spectrum of the transmission signal of the DMT modem system. In this diagram, the band of 4 kHz or lower represents the normal telephone service constituting an audio band communication using the audio band, the band of 30 kHz to 320 kHz represents the up multicarrier wave for the ADSL communication of the DMT modem system, and the band of 30 kHz to about 1.1 MHz represents the down multicarrier wave for the ADSL communication of the DMT modem system. In the ADSL communication of the DMT modem system, the down multicarrier and the up multicarrier are overlapped and separated from each other by an echo canceller.

In the data communication apparatus of the DMT modem scheme such as the xDSL communication scheme, the data communication is normally preceded by a training for measuring the S/N ratio of the received wave for each channel. According to the measured values, the gain and the number of transmission bits are assigned to each subchannel. Thus, the gain and the number of transmission bits are determined according to the S/N ratio. Therefore, when the line attenuation is large or noises exist, the S/N ratio is decreased and the number of bits assigned is also reduced.

FIG. 8 shows an example of bit allocation in the case where the interference noises in the assembled-type line of the TCM-ISDN transmission path have an effect on the system. This diagram has been presented in the General Assembly (spring), the Institute of Electronics, Information and Communication Engineers, NTT, B-8-54, 1998, as "Influence of ISDN line on DMT based ADSL transmission characteristics". As clear from this diagram, in the case where NEXT noises shown by dashed line are received as interference noises by the assembled-type line of the TCM-ISDN transmission path, the number of the transmission bits is allocated to each subchannel in such a manner that a frequency of low interference noises has a large bit allocation as indicated by solid line. The gain allocation, unlike the bit allocation, is normally carried out in such a manner that a large gain is allocated to portions with a large interference noise and a small noise to portions with a small interference noise.

In the data communication apparatus of xDSL communication scheme described above, however, the data communication is conducted using the telephone line for the audio band communication with a telephone set or the like. Therefore, the data communication service is unavoidably affected by the telephone service using the audio band. Thus, the characteristics of the telephone line is affected and differentiated between the on-hook state where the audio band communication is not conducted and the off-hook state where the audio band communication is being conducted.

FIG. 9 shows the frequency characteristic on the telephone line in the on-hook and off-hook states for the audio band communication. This was announced in AMD, D.176 (WP1/15) ITU-T SG15, Geneva, Feb. 9–20, 1998, as "Empirical Characterization of In-Home Telephone Wiring". As clear from this diagram, the gain level of the data communication conducted using the telephone line varies between the on-hook state and the off-hook state in audio band communication. This diagram shows that the gain varies considerably in the off-hook state where the audio band communication is being conducted using the telephone line, and as compared with the on-hook state where the audio band communication is not being conducted the gain characteristic is extremely deteriorated.

Assume that the training is conducted only in the on-hook state where the receiver is hung up to form a bit map for determining the bit allocation and gain of each channel or to conduct the coefficient training for adaptive equalization on the data communication apparatus side using the telephone line, so that the communication is conducted with the optimum bit allocation, the optimum gain setting and the optimum adaptive equalization filter for the particular telephone line. In the off-hook state where the receiver is picked up for audio band communication, the characteristics of the telephone line undergo a change. Thus, the problem is that each characteristic is no longer optimum, and the data transmission rate is required to be improved more without which an efficient communication becomes impossible.

The present invention has been developed to obviate these problems. It is an object of this invention is to provide a data communication apparatus in which data communication can be effected efficiently using the telephone line inspite of the characteristic change occurring between the on-hook state with the audio band communication not going on using the telephone line and the off-hook state where the audio band communication is being conducted data communication can be effected efficiently using the telephone line.

More specifically, when the data communication is not being conducted, the on-hook or off-hook state of the audio band communication is detected, and the characteristic of each state is trained. Thus, a table of the bit allocation, the gain setting, the adaptive equalization coefficient is prepared for each of the on-hook and off-hook states. During the data communication, the respective values are switched between the on-hook and off-hook states. Further, in the case where the telephone is not in use as the on-hook state is detected, the communication band is shifted or enlarged to the telephone service band.

DISCLOSURE OF THE INVENTION

The present invention provides a data communication apparatus for conducting the data communication using the telephone line for the audio band communication, characterized by comprising a detection unit for detecting whether the audio band communication is being conducted or not on the telephone line and a communication unit for conducting the data communication through the telephone line with the characteristics changed between the active audio band communication and the inactive audio band communication based on the detection output of the detection unit.

According to another aspect of the invention, the communication unit includes an active audio band communication coefficient table for storing the equalization coefficients when the audio band communication is being conducted on the telephone line, an inactive audio band communication coefficient table for storing the equalization coefficients when the audio band communication is not being conducted on the telephone line, and an equalizer for equalizing, based on the detection output of the detection unit, the receive signal of the data communication according to the audio band communication coefficient table when the audio band communication is being conducted on the telephone line, and the receive signal of the data communication according to the inactive audio band communication coefficient table when the audio band communication is not being conducted on the telephone line, characterized in that the noise removal characteristic is changed between the active audio band communication and the inactive audio band communication thereby to conduct the data communication through the telephone line.

According to still another aspect of the invention, the communication unit includes an active audio band communication bit allocation table for storing the bit allocation of each channel of data communication when the audio band communication is being conducted on the telephone line, an inactive audio band communication bit allocation table for storing the bit allocation of each channel of data communication when the audio band communication is not being conducted on the telephone line, and a bit allocator for allocating, based on the detection output of the detection unit, bits to each channel according to the active audio band communication bit allocation table when the audio band communication is being conducted on the telephone line, and bits to each channel according to the inactive audio band communication table when the audio band communication is not being conducted on the telephone line, characterized in that the bit allocation characteristic to each channel is changed between the active audio band communication and the inactive audio band communication thereby to conduct the data communication through the telephone line.

According to a further aspect of the invention, the communication unit includes an active audio band communication gain allocation table for storing the gain allocation of each channel of data communication when the audio band communication is being conducted on the telephone line, an inactive audio band communication gain allocation table for storing the gain allocation of each channel of data communication when the audio band communication is not being conducted on the telephone line, and a gain allocator for allocating, based on the detection output of the detection unit, the gain to each channel according to the active audio band communication gain allocation table when the audio band communication is being conducted on the telephone line, and the gain to each channel according to the inactive audio band communication table when the audio band communication is not being conducted on the telephone line, characterized in that the gain allocation characteristic to each channel is changed between the active audio band communication and the inactive audio band communication thereby to conduct the data communication through the telephone line.

According to a still further aspect of the invention, there is provided a data communication apparatus for conducting the data communication using the telephone line for audio band communication, characterized by comprising a detection unit for detecting whether or not the audio band communication is being conducted on the telephone line, and a communication unit for conducting, based on the detection output of the detection unit, the data communication using a predetermined band not interfering with the audio band communication at the time of active audio band communication, and the data communication using up to the neighborhood of the audio band interfering with the audio band communication at the time of inactive audio band communication.

According to a yet further aspect of the invention, there is provided a data communication apparatus for conducting the data communication using the telephone line for audio band communication, characterized by comprising a detection unit for detecting whether or not the audio band communication is being conducted on the telephone line, and a communication unit for conducting, based on the detection output of the detection unit, the data communication using a predetermined band not interfering with the audio band communication at the time of active audio band communication, and the data communication using up to the audio band at the time of inactive audio band communication, the communication unit including, on the transmitting end alone, a filter for removing the frequency band of the ring tone signal for transmitting an audio band communication request to the receiving end.

According to a still further aspect of the invention, there is provided a data communication apparatus characterized in that the data communication is the ADSL data communication of discrete multitone modem scheme, and the apparatus is an ADSL communication modem.

BEST MODE FOR CARRYING OUT THE INVENTION

An embodiment of the data communication apparatus according to the present invention will be explained in detail below with reference to the drawings.

Figure 1:
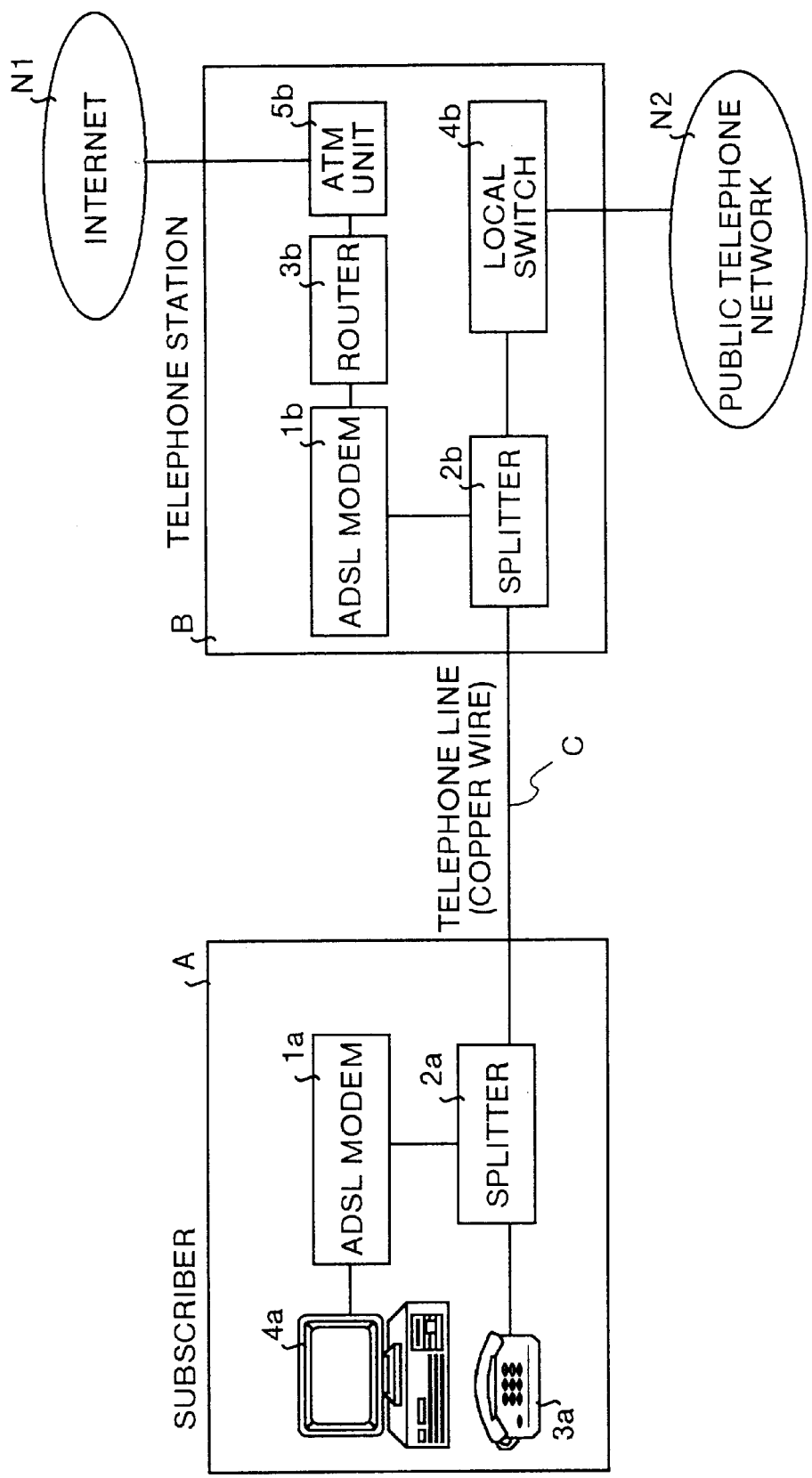
FIG. 1 is a diagram showing the entire data communication system employing a data communication apparatus according to a first embodiment of the present invention.

FIG. 1 shows the entire data communication system employing a data communication apparatus according to a first embodiment of the invention. In this drawing, A designates a subscriber, 1a an ADSL modem employing the data communication apparatus according to the first embodiment, 2a a splitter, 3a a telephone set for conducting the audio band communication in the audio band through a telephone line C, and 4a a computer system for conducting the data communication by transmitting/receiving or downloading the multimedia data such as images and voices free of charge or on a fee-charging basis through the telephone line C.

B designates a telephone station, 1b an ADSL modem employing the data communication apparatus according to the first embodiment, 2b a splitter, 3b a router, 4b a local switch, and 5b an ATM unit.

C designates a telephone line such as a coaxial cable made of copper, N1 the Internet for the ATM unit 5b to conduct the data communication, and N2 a public telephone network for the local switch 4b to conduct the communication.

Figure 2:
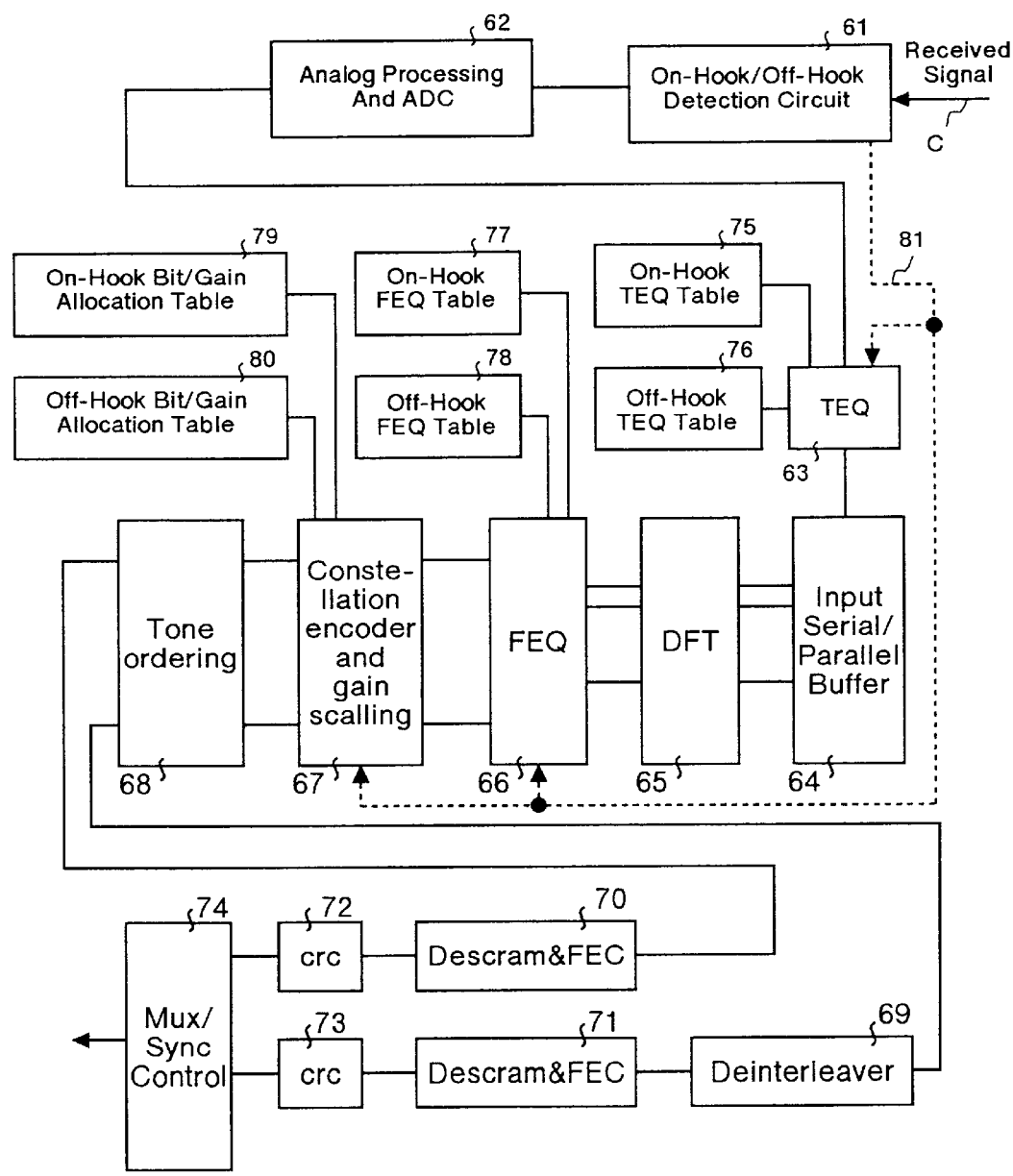
FIG. 2 is a diagram showing a detailed configuration of ADSL modems 1a, 1b employing a data communication apparatus according to the first embodiment of the invention.

FIG. 2 shows a detailed configuration of the receiver of the ADSL modems 1a, 1b employing the data communication apparatus according to the first embodiment of the invention. In this drawing, 61 designates an on-hook/off-hook detection circuit, 62 an analog processing and A/D converter (ADC), 63 a time domain equalizer (TEQ), 64 an input serial/parallel buffer, 65 a discrete Fourier transform unit (DFT), 66 a frequency domain equalizer (FEQ), 67 a constellation encoder and gain scaling, 68 a tone ordering, 69 a deinterleaver, 70, 71 are descramble and forward error correction (FEC), 72, 73 are cyclic redundancy check (CRC), and 74 a mux/sync control.

Further, 75 designates an on-hook TEQ table for providing the on-hook equalization coefficient to the time domain equalizer (TEQ) 63, 76 an off-hook TEQ table for providing the off-hook equalization coefficient to the time domain equalizer (TEQ) 63, 77 an on-hook FEQ table for providing the on-hook equalization coefficient to the frequency domain equalizer (FEQ) 66, and 78 an off-hook FEQ table for providing the off-hook equalization coefficient to the frequency domain equalizer (FEQ) 66. The equalization coefficients are set in the tables 75 to 78 for each time component and frequency component by carrying out a training during the training period before-the start of the ADSL communication in such a manner as to secure substantially the same gain for each time component and each frequency component in on-hook and off-hook states for each of the TEQ 63 and FEQ 66.

Further, 79 designates an on-hook bit/gain allocation table for presetting the bit allocation and the gain allocation for each frequency in on-hook state, 80 an off-hook bit/gain allocation table for presetting the bit allocation and the gain allocation for each frequency in off-hook state. Each allocation data set in these tables 79, 80, like the tables 75 to 78 of the TEQ 63 and FEQ 66, is set by a training during the training period before starting the ADSL communication. These tables 75 to 80 may be configured into a single table.

Now, the operation will be explained. First, an explanation will be given of the general operation of the ADSL data communication system shown in FIG. 1. As shown in FIG. 1, in this data communication system, the frequency division between the telephone service using the conventional telephone set 3a and the ADSL data communication service using the computer system 4a is carried out by the splitters 2a, 2b, so that the frequency of 4 kHz or lower is used as the audio band for the telephone service, and higher frequencies are used as the ADSL modem band for data communication.

Specifically, the telephone service is provided by connecting the telephone set 3a using the audio band not more than 4 kHz from the public network N2 on the telephone station B side through the local switch 4b, the splitter 2b on the telephone station B side and the splitter 2a on the subscriber A side. In this case, the signal in the audio band is not transmitted to the ADSL modems 1b, 1a side due to the low-pass filter or the like in the splitters 2b, 2a.

On the other hand, the data communication service is provided by connecting the ADSL modem 1b through a router (not shown) constituting the Internet N1 on the telephone station B side, the ATM unit 5b and the router 3b thereby to conduct the communication with the computer system 4a through the splitter 2b on the telephone station B side, the splitter 2a on the subscriber A side and the ADSL modem 1a. In this case, the ADSL modems 1a, 1b receive and download multimedia data such as data, images and voices free of charge or on a fee-charging basis from the provider or the like using the audio band higher than 4 kHz through a high-pass filter or the like in the splitters 2a, 2b, or the data communication is conducted with other computer systems or the like through a network such as the internet N1.

Now, an explanation will be given of the operation of the ADSL modems 1a, 1b using the data communication apparatus according to the first embodiment of the invention shown in FIG. 2. By the way, in the description that follows, reference will be made of the operation with the ADSL modem 1a on the subscriber A side constituting the receiving end, for example.

First, the receive digital signal is input to the on-hook/off-hook detection circuit 61 of the ADSL modem 1a through the telephone line C. The on-hook/off-hook detection circuit 61 detects the DC voltage level of the telephone line C, of which the voltage level is −48 V in the on-hook state where the audio band communication is not conducted by the telephone set 3a or the like and −5 V in the off-hook state where the audio band communication is being conducted by the telephone set 3a. It is therefore detected from the voltage value of this telephone line C whether the telephone line C is in on-hook or off-hook state, and the state detection signal 81 is output.

The analog processing and A/D converter 62 applies the received wave through a LPF (low-pass filter), and converts the analog waveform into the digital waveform through the A/D converter, followed by the time domain equalizer (TEQ) 63 performing the adaptive equalization process in the time domain.

In this process, the time domain equalizer (TEQ) 63 is supplied from the on-hook/off-hook detection circuit 61 with a status detection signal 81 indicating whether the telephone line C is currently in on-hook state or in off-hook state. In the case where the status detection signal 81 indicates an on-hook state, the received signal is subjected to the equalization processing based on the equalization coefficient of the on-hook TEQ table 75, while in the case where the status detection signal indicates an off-hook state, the received signal is subjected to the equalization processing based on the equalization coefficient of the off-hook TEQ table 76. Specifically, though not shown, the gain level in the time domain varies from one time to another separately for the on-hook state and off-hook state. Thus, the gain level is adjusted each time separately for on-hook and off-hook states in such a manner that the gain level at each time in the time domain does not affect the gain level at other times.

The data subjected to the adaptive equalization processing in the time domain by the time domain equalizer (TEQ) 63 is converted from serial data to parallel data through the input serial/parallel buffer 64, subjected to the discrete Fourier transform in the discrete Fourier transform unit (DFT) 65, and further subjected to the frequency domain adaptive equalization processing in the frequency domain equalizer (FEQ) 66.

Figure 8:
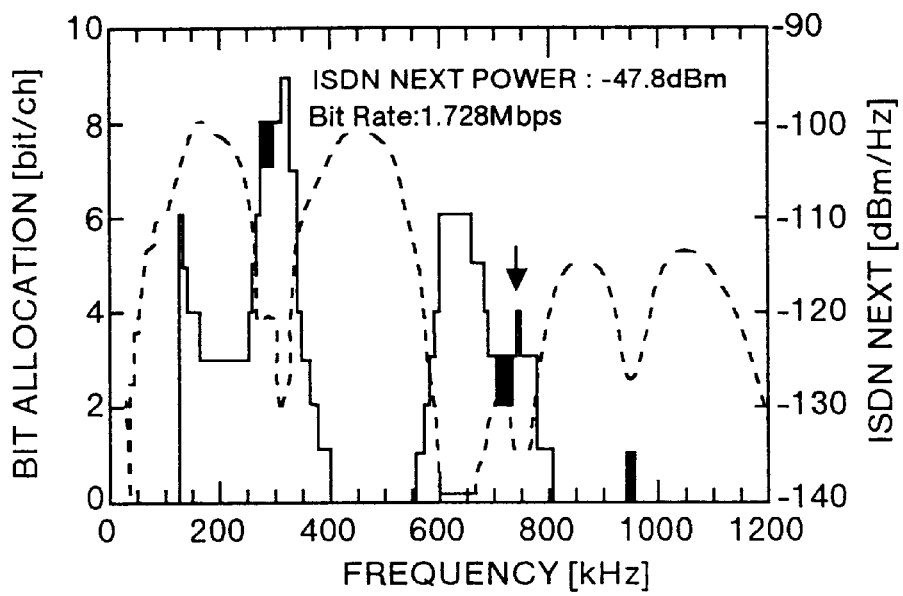
FIG. 8 is a diagram showing an example of bit allocation under the effect of the interference noises in the assembled-type TCM-ISDN transmission path.
Figure 9:
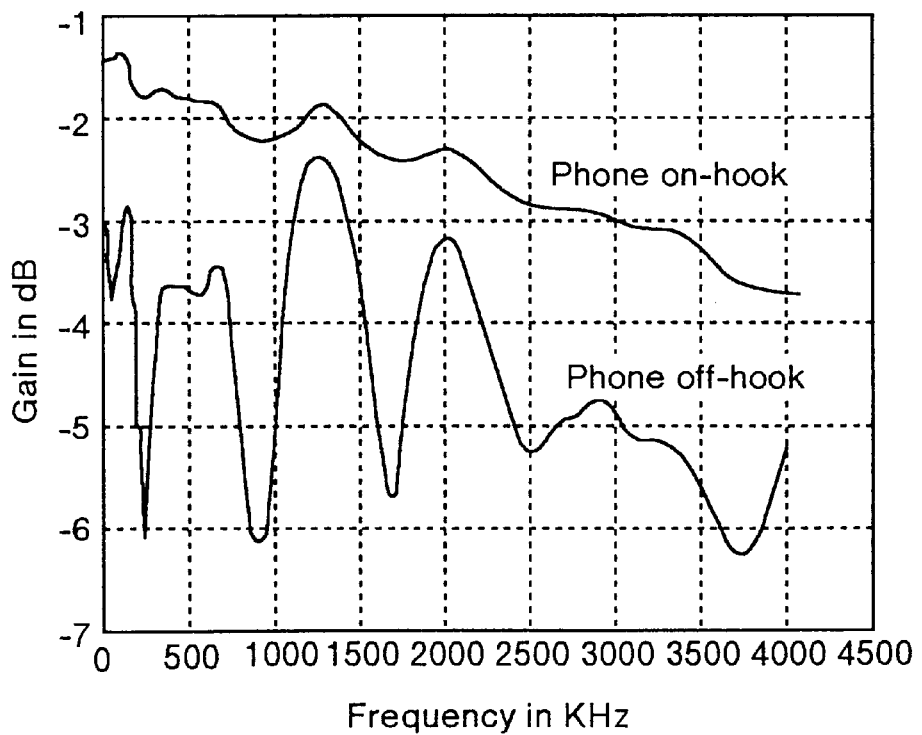
FIG. 9 is a diagram showing the frequency characteristic on the telephone line in on-hook and off-hook states for audio band communication.

In this process, the frequency domain equalizer (FEQ) 66 is supplied with, as in the case of the time domain equalizer (TEQ) 63, the status detection signal 81 from the on-hook/off-hook detection circuit 61 indicating whether the telephone line C is in off-hook or on-hook state. In the case where the status detection signal 81 indicates the on-hook state, the receive signal is subjected to the equalization processing based on the equalization coefficient of the on-hook FEQ table 77. In the case where the off-hook state is indicated, on the other hand, the received signal is subjected to the equalization processing based on the equalization coefficient of the off-hook FEQ table 78. Specifically, as shown in FIG. 8, the gain level for each frequency in the frequency domain changes separately in on-hook state and off-hook state. Therefore, the gain level is adjusted separately for on-hook and off-hook states to assure a constant gain level for each frequency.

The data subjected to the frequency domain adaptive equalization processing by the frequency domain equalizer (FEQ) 66 is input into the constellation encoder gain scaling 67, which allocates bits and gain to regenerate the constellation data.

In this process, the constellation encoder gain scaling 67, like the time domain equalizer (TEQ) 63 or the frequency domain equalizer (FEQ) 66, is supplied with the status detection signal 81 from the on-hook/off-hook detection circuit 61 indicating whether the telephone line C is currently on-hook or off-hook. In the case where the status detection signal 81 indicates an on-hook state, the bits and gain are allocated to the received signal based on the allocation data of the on-hook bit/gain allocation table 79, while in the case where an off-hook state is indicated, on the other hand, bits and gain are allocated to the received signal based on the allocation data of the off-hook bit/gain allocation table 80.

Specifically, the constellation encoder gain scaling 67 is supplied with a signal subjected to the gain equalization processing in accordance with the on-hook or off-hook state in the time and frequency domains by the time domain equalizer (TEQ) 63 and the frequency domain equalizer (FEQ) 66, respectively. Thus, the on-hook bit/gain allocation table 79 and the off-hook bit/gain allocation table 80 are used by being switched, so that the gain allocation and the bit allocation are conducted in a manner corresponding to the gain level for each time and frequency separately for the on-hook and the off-hook states.

The subsequent processing is the same as the ordinary processing, in which the data are converted into serial one in the tone ordering 68, the FEC or the descramble processing is performed in the descramble forward error correction 70. In some cases, after the deinterleave processing in the deinterleaver 69, the data are subjected to the FEC or the descramble processing in the descramble forward error correction 71. After that, the cyclic redundancy check is performed in the crc 72, 73, and then the data are reproduced in the mux/sync control 74.

These processing are performed also during the training period before data communication as well as during the data communication, so that the optimum equalization coefficient, bit allocation value and the gain allocation value are set in the tables 75 to 80 for each of the on-hook and the off-hook states.

Thus, with the data communication system according to the first embodiment, the on-hook or off-hook state indicating whether the audio band communication using the telephone line C is going on or not is detected during what is called the training period before the data communication is conducted by the apparatus. In this way, the bit allocation, the gain allocation and the adaptive equalization (TEQ, FEQ) coefficients are determined separately for the off-hook and on-hook states and set in separate tables 75 to 80. In actual data communication operation, the on-hook or off-hook state of the audio band communication on the telephone line C is detected, so that the bit allocation, the gain allocation and the adaptive equalization are performed by different tables 75 to 80 for the on-hook state and the off-hook state. As a result, the optimum communication can be conducted in each of the on-hook and off-hook states, with the data transmission rate improved and the error rate reduced as compared with the case where such actions are not taken.

In the first embodiment described above, the bit allocation, the gain allocation and the adaptive equalization (TEQ, FEQ) coefficient are determined and set in tables 75 to 80 separately for the off-hook and the on-hook states so that at the time of data transmission, the bit allocation, the gain allocation and the adaptive equalization are carried out according to different tables 75 to 80 for the on-hook and off-hook states. The invention, on the other hand, is not limited to such a processing, but only the bit allocation, only the gain allocation, only the frequency domain adaptive equalization (FEQ) or only the time domain adaptive equalization (TEQ) may be performed in accordance with the on-hook or off-hook state. Further, an arbitrary combination of actions can of course be executed, such as the bit allocation combined with the gain allocation, the gain allocation combined with the frequency domain adaptive equalization (FEQ) or the bit allocation combined with the frequency domain adaptive equalization (FEQ).

The first embodiment is described above by reference to a data communication apparatus and a data communication system using the splitters 2a, 2b as shown in FIG. 1. The invention is not limited to them, however, but is also applicable with equal effect to a data communication apparatus or a data communication system free of splitter on both the subscriber side and the telephone station side and a data communication apparatus or a data communication system free of splitter only on the subscriber side, as described with the second embodiment shown in FIG. 3.

Now, a data communication apparatus according to a second embodiment of the invention will be explained with reference to the drawings. Unlike the data communication apparatus of the first embodiment shown in FIG. 1, the second embodiment will be described taking the ADSL.Lite (corresponding to the ITU-T standard G.Lite, hereinafter referred to as G.Lite) having a splitter as an example.

With the data communication system of G.Lite, the work for installing the splitter is required of an ordinary telephone subscriber, which led to the tendency of rejecting the introduction of the xDSL communication system such as ADSL. The communication system under consideration, on the other hand, has been proposed as a splitterless system with a low 1.5 Mbps communication speed specified in a standard. In view of this advantages that no special work is required as the system is free of the splitter, and that inspite of a lower ADSL transmission rate due to the noise interference between the audio band of the telephone service and the ADSL band of the data communication service and the impedance variations due to the communication in the telephone band having an effect on the ADSL communication, the transmission rate of about 1.5 Mbps is considered to satisfy the users for the time being to access the internet.

Figure 3:
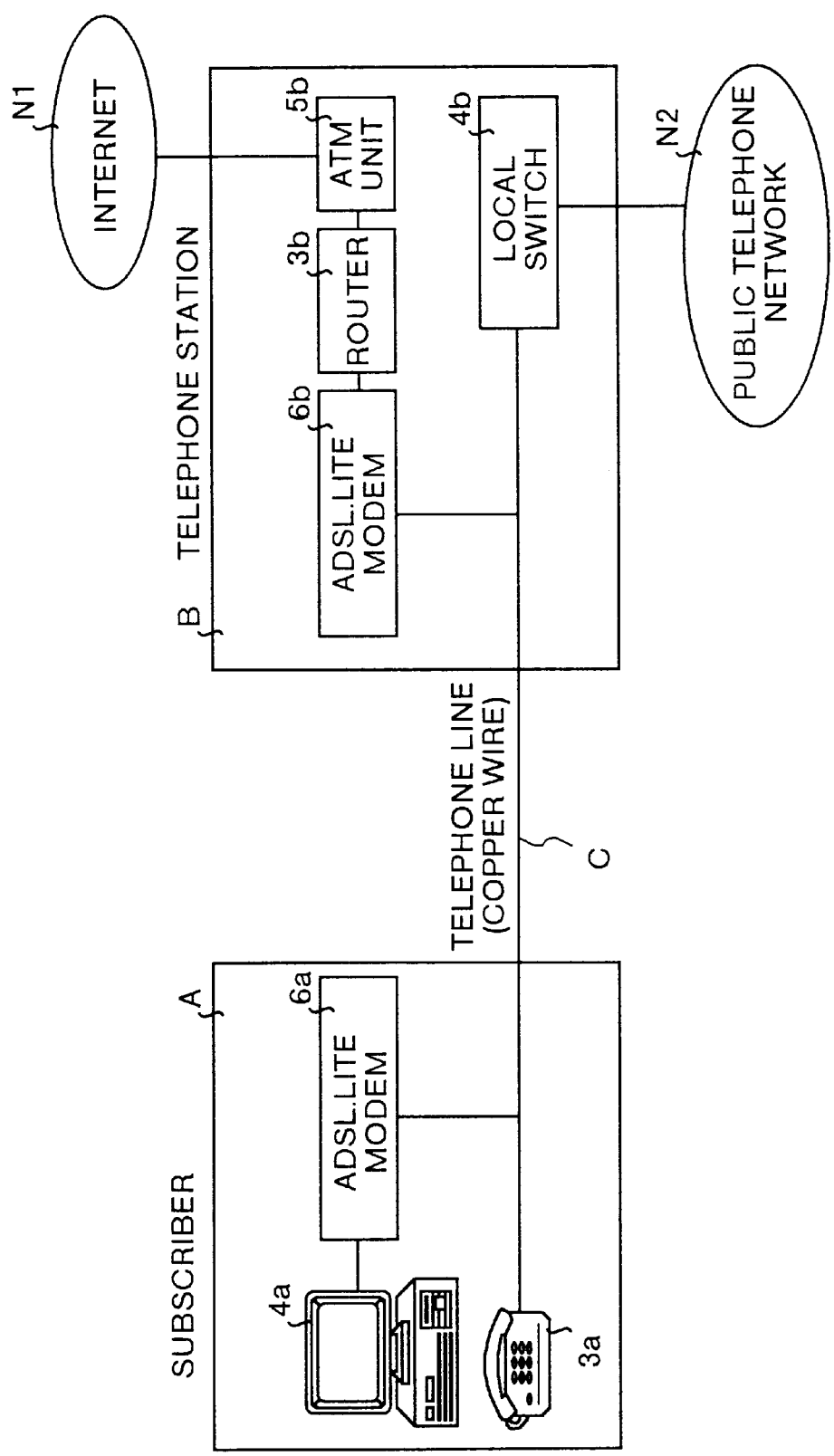
FIG. 3 is a diagram showing the entire data communication system employing a data communication apparatus according to a second embodiment of the invention.

FIG. 3 shows a general configuration of a data communication system employing the data communication apparatus according to the second embodiment of the invention. In this diagram, character A designates a subscriber, 3a a telephone set for conducting the audio band communication on the telephone line C, 4a a computer system for conducting the data communication on the telephone line C, and 6a an ADSL.Lite modem employing the data communication apparatus according to the second embodiment. B designates a telephone station, 3b a router, 4b a local switch, 5b an ATM unit, and 6b an ADSL.Lite modem employing the data communication apparatus according to the second embodiment. Further, C designates a telephone line such as a coaxial cable made of copper wire, N1 the Internet used by the ATM unit 5b for communication, and N2 a public telephone network used by the local switch 4b for communication. The configuration other than the ADSL.Lite modems 6a, 6b is the same as the one shown in the first embodiment of FIG. 1 and is provided with the same reference numerals.

Figure 4:
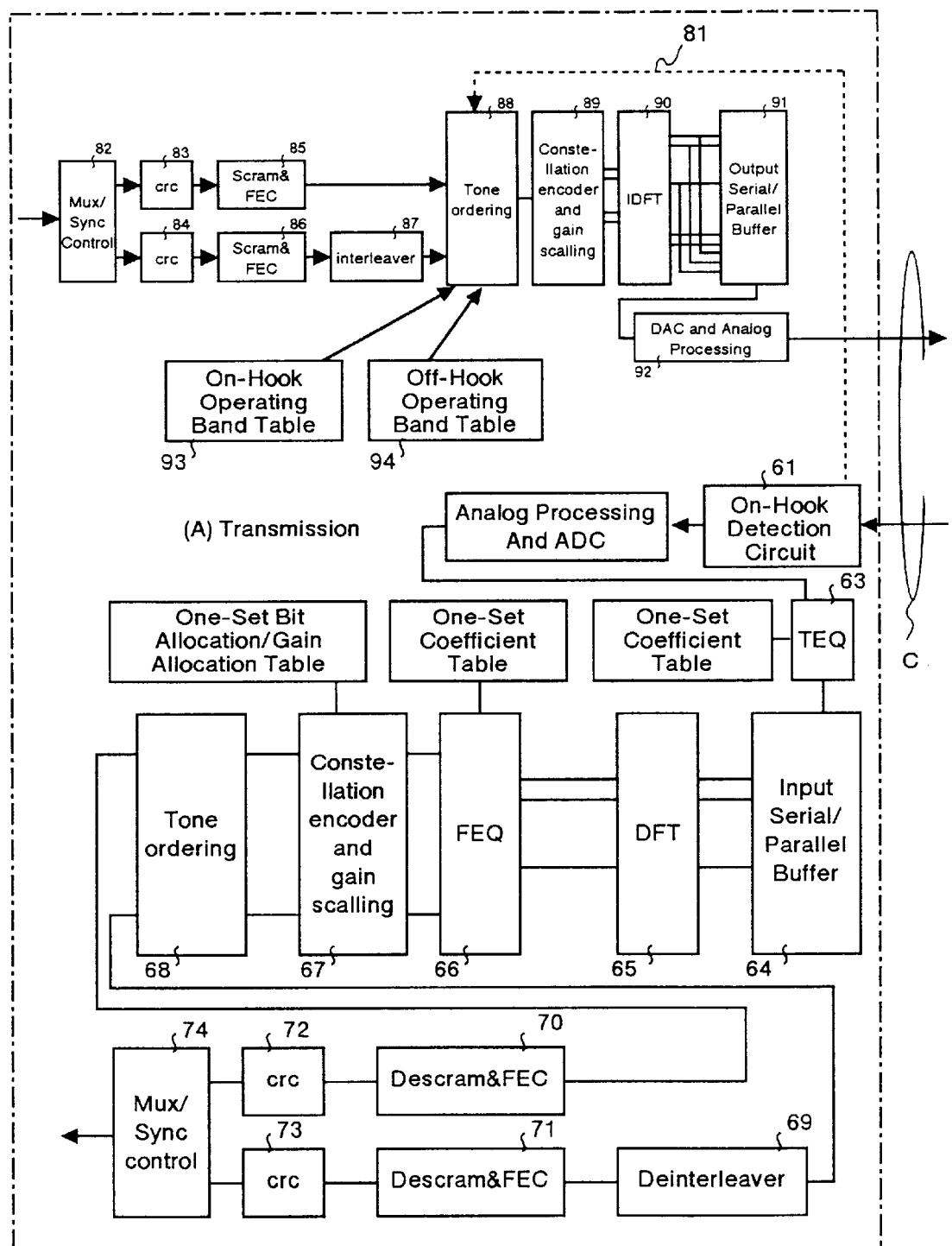
FIG. 4 is a diagram showing a detailed configuration of the ADSL.Lite modems 6a, 6b employing a data communication apparatus according to the second embodiment of the invention.

FIG. 4 shows a detailed configuration of the ADSL.Lite modems 6a, 6b employing the data communication apparatus according to the second embodiment of the invention. The configuration on the receiver side of the ADSL.Lite modems 6a, 6b according to this second embodiment is the same as that of the conventional ADSL modem except for the on-hook/off-hook detection circuit 61 inserted in the former. The configuration is also identical to the configuration on the receiver side of the ADSL modems 1a, 1b according to the first embodiment shown in FIG. 2. Therefore, the components shown in FIG. 4 which have the same configuration as the components on the receiver side of the ADSL modems 1a, 1b according to the first embodiment of FIG. 2 will be provided with the same reference numerals and description theirof will be omitted. Only the configuration on the transmitter side will be explained anew.

Specifically, the transmitter side is so configured that, 82 designates a mux/sync control, 83, 84 are cyclic redundancy check (crc), 85, 86 are scramble and forward error correction (FEC), 87 an interleaver, 88 a tone ordering, 89 a constellation encoder and gain scaling, 90 an inverse discrete Fourier transform unit (IDFT), 91 an output serial/parallel buffer, and 92 a D/A converter (DAC) and analog processing. This configuration corresponds to the configuration on the receiver side except that the TEQ 63 and the FEQ 66 are not included.

Further, 93 designates an on-hook operating band table in which one or a plurality of operating bands for on-hook data communication are set in the case where the audio band communication on the telephone line C is not being conducted, and 94 designates an off-hook operating band table in which operating bands for off-hook data communication are set in the case where the audio band communication on the telephone line C is being conducted. By the way, according to this second embodiment, the on-hook operating band table 93 and the off-hook operating band table 94 are described as separate entities. Nevertheless, the operating bands for data communication-for on-hook and off-hook states may of course be set in a single table. This is also the case with the tables 75 to 80 of the first embodiment.

Now, the operation will be explained. In the description that follows, the operation is referred to in which the data communication is conducted by the ADSL.Lite modem 6a on the subscriber A side. First, the data input from the computer system 4a (from the ATM unit 5b, etc. through the router 3b in the case of the ADSL.Lite modem 6b on the telephone station B side) to this ADSL.Lite modem 6a are modulated in the mux/sync control 82, subjected to a predetermined processing in the CRC 83, 84 and the scramble and forward error correction 85, 86, and in some cases subjected to the interleave processing by the interleaver 87. The processing up to this point is the same as the conventional processing.

Figure 5:
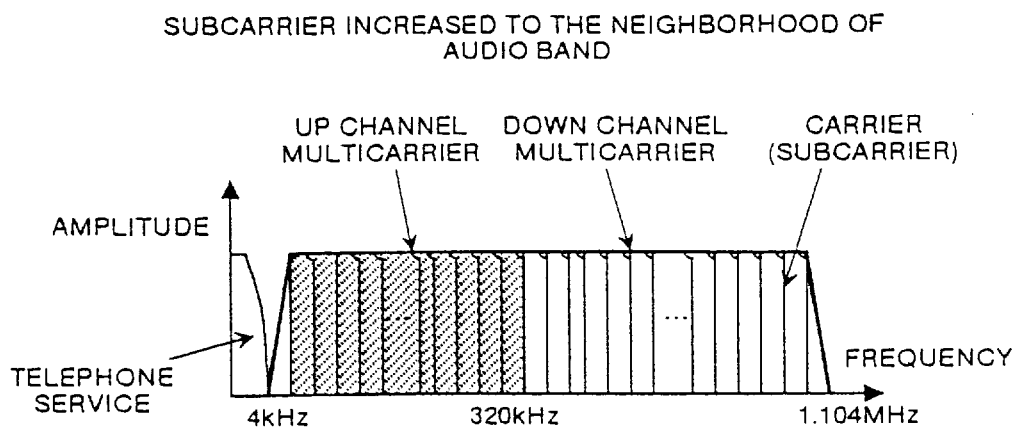
FIGS. 5(a) to (c) are diagrams each showing a specific example of an operating band for data communication which is set in a on-hook operating band table 93 according to the second embodiment.
Figure 5:
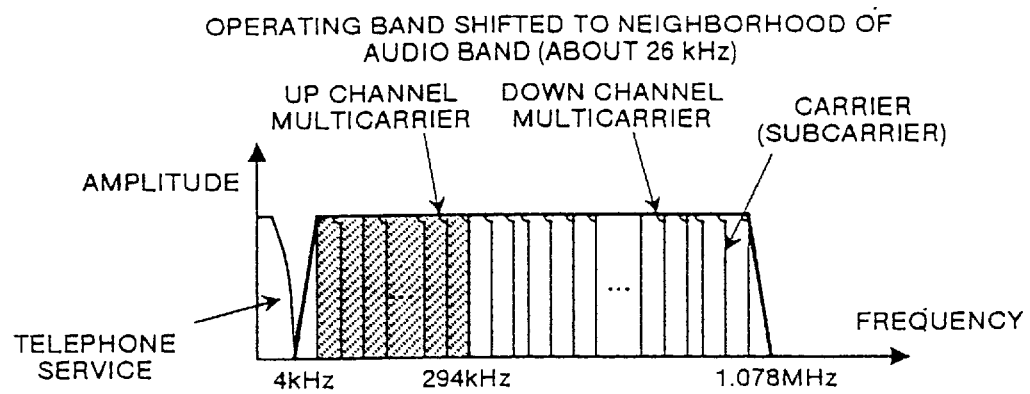
Figure 5:
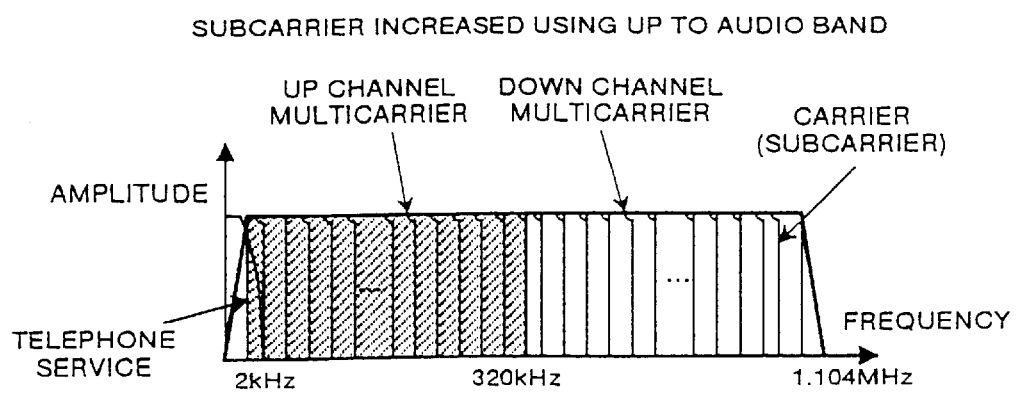

The tone ordering 88 assigns the signal thus processed to each channel including the carrier (subchannel) for each frequency band of the DMT modem scheme. In this process, according to the second embodiment, the tone ordering 88 is supplied with the status detection signal 81 indicating whether the existing telephone line C is on-hook or off-hook, from the on-hook/off-hook detection circuit 61 on the receiver side explained with reference to the first embodiment. Thus, in the case where the status detection signal 81 indicates the on-hook state where the audio band communication is not being conducted, the tone ordering 88 allocates the data to each channel in the manner shown in FIG. 5 described later, for example, based on the operating band set in the on-hook operating band table 93. At the same time, in the case where the off-hook state is indicated, on the other hand, the data are allocated to each channel in the conventional or normal operating band not interfering with the audio band based on the operating band set in the off-hook operating band table 94.

At the same time, the tone ordering 88 is required to notify the data communication apparatus at the receiving end of data communication of the fact that the data allocation to each channel is changed between on-hook and off-hook states, and which of a plurality, if any, of allocation methods to each channel as shown in FIGS. 5(a) to 5(c) described later has been employed. The tone ordering 88 thus transmits the data indicating the allocation method together with or multiplexed on the data to be communicated.

The subsequent operation is the same as that of the normal ADSL.Lite modem 6a. Specifically, the constellation and the gain are set by the constellation encoder gain scaling 89, the inverse discrete Fourier transform is performed by the inverse discrete Fourier transform unit (IDFT) 90, the parallel output is converted into a serial one by the output serial/parallel buffer 91, the digital/analog conversion is effected by the D/A converter and analog processing 92, and the data are transmitted onto the telephone line C through an internal LPF (not shown), thus sending the data to the telephone station B.

The subscriber connected through the telephone station B or through the telephone station B and the Internet N1 receives the particular data by way of his computer system or the like. The tone ordering on the receiver side such as the ADSL modem or the ADSL.Lite modem of the computer system decodes the data indicating the method of allocating data to each channel at the data transmitting side, and detects the channel to be used, through which the data transmitted are reproduced as serial data.

FIGS. 5(a) to 5(c) show specific examples of the operating band for the data communication set in the on-hook band table 93 according to the second embodiment.

FIG. 5(a) shows the state of the carrier (subcarrier) of DMT modem scheme increased up to the neighborhood of the audio band of 4 kHz for providing the telephone service of audio band communication in the on-hook state where the audio band communication is not being conducted. In this case, the band of 4 kHz to 320 kHz is used by the multicarrier of the up channel, and the band of 4 kHz to 1.104 MHz is used by the multicarrier of the down channel.

As a result, in this case, in the on-hook state where the audio band communication is not being conducted, the operating band for data communication is expanded and so is the operating channel. At the same time, the lower the frequency, the smaller the attenuation of the transmission path, thereby making it possible to extend the communication distance in terms of each ADSL transmission rate, while increasing the transmission rate in the service area.

FIG. 5(b) shows the state of the carrier in the case where the operating band of the DMT modem scheme is shifted (about 26 kHz) up to the neighborhood of the audio band of 4 kHz in the on-hook state where the audio band communication is not being conducted.

In this case, the operating band is shifted and therefore the carrier (subcarrier) of the DMT modem scheme has not increased. The multicarrier for the up channel uses the band of 4 kHz to 294 kHz and the multicarrier of the down channel uses the band of 4 kHz to 1.078 MHz.

As a result, in this case, in view of the fact that the operating band is shifted and the carrier (subcarrier) of DMT modem scheme does not increase, the lower the frequency, the smaller the attenuation amount of the transmission path. Therefore, the communication distance for each ADSL transmission rate can be increased while at the same time increasing the transmission rate in the service area.

FIG. 5(c) shows the state of the carrier (subcarrier) of DMT modem scheme increased up to the audio band of 4 kHz in the on-hook state where the audio band communication providing the telephone service is not being conducted.

As a result, as in the case shown in FIG. 5(a), in the on-hook state, the operating band for data communication expands. At the same time, since the lower the frequency, the smaller the attenuation amount of the transmission path, the communication distance for each ADSL transmission rate can be further increased as compared with the case shown in FIG. 5(a), while increasing the transmission rate or the transmission data amount in the service area.

In the case of FIG. 5(c), however, the data communication is conducted using even the audio band of 4 kHz or less, and therefore, the signal transmitted on the audio band carrier and received by the telephone set is liable to be detected as a ring tone signal for calling out the other party which is transmitted for the audio band communication in the on-hook state, often resulting in calling out the local telephone set or the telephone set of the other party of communication.

Figure 6:
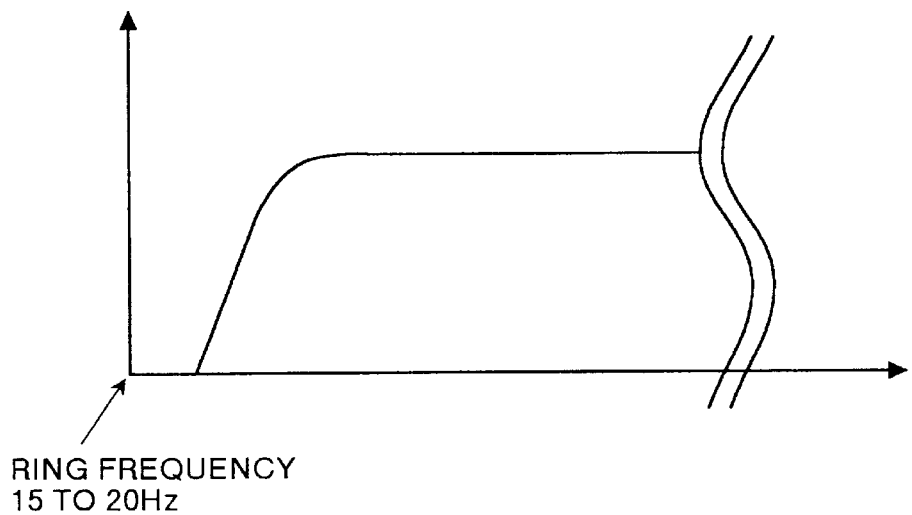
FIG. 6 is a diagram showing the characteristic of a filter to be installed in the output stage of the transmitter of the data communication apparatus shown in FIG. 5(c)
Figure 7:
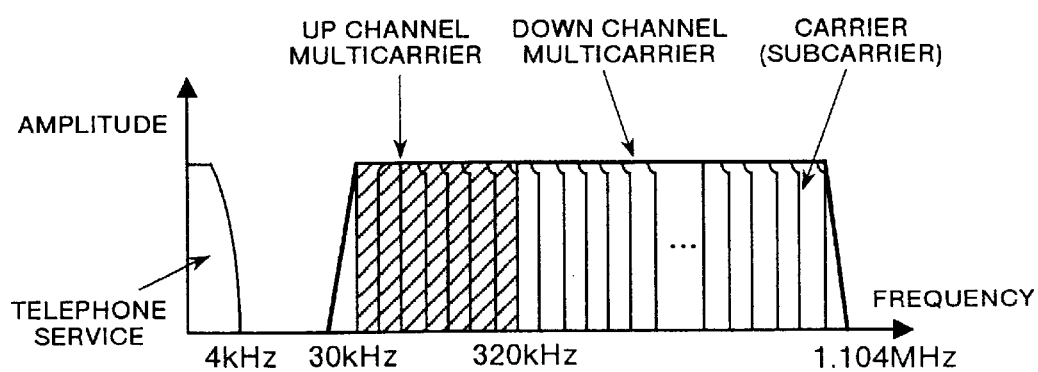
FIG. 7 is a diagram showing a spectrum of the transmission signal of DMT modem scheme.

For this reason, in the case shown in FIG. 5(c), in order for the telephone set to avoid the ring detection, a high-pass filter having the characteristic as shown in FIG. 6 is provided in the output unit on the transmitter side of the ADSL.Lite modem 6a, which is the output serial/parallel buffer 91 or the DA converter analog processing 92, for example, in such a manner as to remove the band of about 15 to 20 Hz constituting the ring tone signal frequency.

By doing so, as shown in FIG. 5(c), even when the data communication is conducted using the audio band of 4 kHz in the on-hook state where the audio band communication providing the telephone service is not being conducted, it is possible to prevent the local telephone set or the telephone set of the other end of communication from being called out for audio band communication erroneously.

Thus, with the data communication apparatus according to the second embodiment, in the on-hook state where the audio band communication with the telephone set is not being conducted, as shown in FIGS. 5(a) to 5(c), the carrier (subcarrier) is increased up to the neighborhood of the audio band, the operating band for data communication is shifted to the neighborhood of the audio band or the subcarrier is increased using up to the audio band. In this way, the transmission data amount can be increased. Further, since the carrier frequency is decreased, the attenuation amount of the telephone line providing the transmission path is decreased. Thus, the communication distance for each transmission rate of ADSL can be extended, while at the same time increasing the transmission rate within the service area.

The second embodiment was explained above as a separate embodiment from the first embodiment. Nevertheless, the second embodiment may of course be configured as an addition to the first embodiment. Specifically, the time domain equalizer (TEQ) 63, the frequency domain equalizer (FEQ) 66 and the constellation encoder gain scaling 67 of the ADSL.Lite modem 6a according to the second embodiment shown in FIG. 4 may be provided with, like the ADSL modem 1a according to the first embodiment shown in FIG. 2, an on-hook TEQ table 75, an off-hook TEQ table 76, an on-hook FEQ table 77, an off-hook FEQ table 78, an off-hook bit/gain allocation table 79 and an off-hook bit/gain allocation table 80, respectively, and further supplied with a status detection signal 81 from the on-hook/off-hook detection circuit 61 or otherwise configured similarly to the configuration of the first embodiment.

In the first and second embodiments, the data communication apparatus according to this invention is explained with a modem of ADSL communication scheme such as the ADSL modems 1a, 1b, the ADSL.Lite modems 6a, 6b. However, the invention is not limited to such modems, but is applicable with equal effect to the modems for the XDSL communication such as the HDSL communication and the SDSL communication other than the ADSL communication scheme, and to the data communication apparatuses other than xDSL, and further to the data communication apparatuses other than modems.

Further, the equipment connected to the ADSL modems 1a, 1b of the first embodiment and the ADSL.Lite modems 6a, 6b of the second embodiment may include, as described above, not only the computer system 4a but also the digital TV set, AV equipment, domestic electric appliances and the whole variety of digital communication devices or domestic electric appliances having such data communication device as a communication modem. For example, such a digital communication device may be built in a cooking unit of a microwave oven or the like which can conduct digital communication through the network, so that the multimedia data such as images and sounds showing the cooking recipe, etc. are downloaded and displayed on the display unit, or provided as an aural guide through the speaker.

As described above, according to this invention, it is detected whether the audio band communication is being conducted on the telephone line, and based on the result of detection, the characteristic is changed between the active audio band communication mode and the inactive audio band communication mode for conducting the data communication through the telephone line. In this way, the optimum data communication can be conducted at the time of both the active audio band communication and the inactive audio band communication.

Especially, according to the invention, the characteristics of the equalizer including the equalization coefficient, the bit allocation and the gain allocation are changed between the active audio band communication and the inactive audio band communication for conducting the data communication. Thus, the S/N ratio can be improved both in the active audio band communication mode and the inactive audio band communication mode for a reduced error probability, while at the same time leading to the effects of extending the communication distance for each transmission rate or increasing the transmission rate within the service area.

According to another aspect of the invention, it is detected whether the audio band communication is being conducted on the telephone line, and based on the detection result, the data communication is conducted using a predetermined band not interfering with the audio band communication which may be going on, whereas the data communication is conducted using up to the neighborhood of the audio band in the inactive audio band communication mode. As a result, the transmission data amount can be increased while at the same time reducing the attenuation amount of the telephone line providing the transmission path due to the reduced carrier frequency, thereby extending the communication distance and the transmission rate within the service area.

INDUSTRIAL APPLICABILITY

As described above, the data communication apparatus according to this invention is suitable for the data communication of xDSL scheme using the telephone line for audio band communication.

What is claimed is:

1. A data communication apparatus which can conduct data communication using the telephone line for audio band communication, comprising:
   a detection unit which detects whether the audio band communication is being conducted on said telephone line; and
   a communication unit which conducts data communication through said telephone line with different characteristics for the active audio band communication and the inactive audio band communication based on the detection output of said detection unit, wherein said communication unit includes;
   an active audio band communication coefficient table for storing the equalization coefficients in the case where the audio band communication is being conducted on said telephone line;
   an inactive audio band communication coefficient table for storing the equalization coefficients in the case where the audio band communication is not being conducted on said telephone line;
   an equalizer for equalizing, based on the detection output of said detection unit, the received signal of the data communication by said active audio band communication coefficients in the case where the audio band communication is being conducted on said telephone line, and the received signal of the data communication by said inactive audio band communication coefficients in the case where the audio band communication is not being conducted on said telephone line; and
   wherein the data communication is conducted through said telephone line with different noise removal characteristics between the active audio band communication and the inactive audio band communication and gain level is adjusted each time separately for on-hook and off-hook states so that gain level at each time in the time domain does not affect the gain level at other times in the time domain.

2. The data communication apparatus according to claim 1, wherein the data communication is the ADSK data communication of discrete multitone modem type, and the apparatus is an ADSL communication modem.

3. A data communication apparatus according to claim 1, which conducts data communication using a telephone line for audio band communication comprising:
   conducting data communication through said telephone line using an operating band, wherein
   said operating band does not interfere with audio band communication when said detection unit detects that audio band communication is being conducted, and
   said operating band being shifted or expanded up to the neighborhood of the audio band interfering with said audio band communication when said detection unit detects that audio band communication is not being conducted.

4. The data communication apparatus according to claim 3, wherein the data communication is the ADSL data communication of discrete multitone modem type, and the apparatus is an ADSL communication modem.

5. The data communication apparatus according to claim 3, wherein said operating band is expanded up substantially to the audio band of 4 kHz when said detection unit detects that audio band communication is not being conducted.

6. A data communication apparatus according to claim 1, for conducting data communication over a standard telephone line comprising:
   a communication circuit which conducts data communication by equalizing a signal received from said phone line according to a set of coefficients, said set of coefficients being determined based on a determination of whether or not audio band communication is being conducted on said telephone line, said determination being made based on a detected dc voltage level of said telephone line.

7. The data communication apparatus according to claim 6, wherein said set of coefficients is determined based on a stored coefficient table which stores a set of equalization coefficients to be used when audio band communication is being conducted on said telephone line, and a separate set of equalization coefficients to be used when audio band communication is not being conducted on said telephone line.

8. The data communication apparatus according to claim 6, wherein said sets of equalization coefficients are determined by carrying out a training before the start of data communication.

9. The data communication apparatus according to claim 8, wherein said sets of equalization coefficients are determined according to said training in order to secure substantially the same gain for each time component and each frequency component, whether or not audio band communication is being conducted on said telephone line during data communication.

10. A data communication apparatus according to claim 1, for conducting data communication over a standard telephone line comprising:
    a communication circuit which conducts data communication by allocating bits to each channel, wherein the bits allocated to each channel are determined according to whether or not audio band communication is being conducted on said telephone line.

11. The data communication apparatus according to claim 10, wherein bits are allocated to each channel based on a bit allocation table which stores a bit allocation for each channel for occasions when audio band communication is being conducted, and which stores a bit allocation for each channel for occasions when audio band communication is not being conducted.

12. The data communication apparatus according to claim 11, wherein said bit allocation table is generated by carrying out a training before the start of data communication.

13. The data communication apparatus according to claim 10, wherein a dc voltage level of said telephone line is detected in order to determine whether or not audio band communication is being conducted on said telephone line.

14. A data communication apparatus according to claim 1, for conducting data communication over a standard telephone line comprising:
   a communication circuit which conducts data communication by allocating gain to each channel, wherein the gain allocated to each channel is determined according to a determination of whether or not audio band communication is being conducted on said telephone line, said determination being made based on a detected dc voltage level of said telephone line.

15. The data communication apparatus according to claim 14, wherein gain is allocated to each channel based on a gain allocation table which stores a gain allocation for each channel for occasions when audio band communication is being conducted, and which stores a gain allocation for each channel for occasions when audio band communication is not being conducted.

16. The data communication apparatus according to claim 15, wherein said gain allocation table is generated by carrying out a training before the start of data communication.

17. The data communication apparatus according to claim 1, wherein said detection unit detects whether or not the audio band communication is being conducted based on a detected dc voltage level of said telephone line.

18. The data communication apparatus according to claim 1, wherein said inactive audio band communication conducted by said communication unit uses up to the neighborhood interfering with an operating band of said audio band communication.

19. A data communication apparatus which can conduct data communication using the telephone line for audio band communication, comprising:
   a detection unit which detects whether the audio band communication is being conducted on said telephone line; and
   a communication unit which conducts data communication through said telephone line with different characteristics for the active audio band communication and the inactive audio band communication based on the detection output of said detection unit, wherein said communication unit includes;
   an active audio band communication bit allocation table for storing the bit allocation for each channel in the case where the audio band communication is being conducted on said telephone line;
   an inactive audio band communication bit allocation table for storing the bit allocation for each channel in the case where the audio band communication is not being conducted on said telephone line;
   a bit allocator for allocating, based on the detection output of said detection unit, the bits to each channel according to said active audio band communication bit allocation table in the case where the audio band communication is being conducted on said telephone line, and the bits to each channel according to said inactive audio band communication bit allocation table in the case where the audio band communication is not being conducted on said telephone line; and
   wherein the data communication is conducted through said telephone line with different bit allocation characteristics for each channel between the active audio band communication and the inactive audio band communication and gain level is adjusted each time separately for on-hook and off-hook states so that gain level at each time in the time domain does not affect the gain level at other times in the time domain.

20. The data communication apparatus according to claim 19, wherein the data communication is the ADSL data communication of discrete multitone modem type, and the apparatus is an ADSL communication modem.

21. A data communication apparatus which can conduct data communication using the telephone line for audio band communication, comprising:
   a detection unit which detects whether the audio band communication is being conducted on said telephone line;
   a communication unit which conducts data communication through said telephone line with different characteristics for the active audio band communication and the inactive audio band communication based on the detection output of said detection unit, wherein said communication unit includes;
   an active audio band communication gain allocation table for storing the gain allocation for each channel in the case where the audio band communication is being conducted on said telephone line;
   an inactive audio band communication gain allocation table for storing the gain allocation for each channel in the case where the audio band communication is not being conducted on said telephone line;
   a gain allocator for allocating, based on the detection output of said detection unit, the gains to each channel according to said active audio band communication gain allocation table in the case where the audio band communication is being conducted on said telephone line, and the gains to each channel according to said inactive audio band communication gain allocation table in the case where the audio band communication is not being conducted on said telephone line; and
   wherein the data communication is conducted through said telephone line with different gain allocation characteristics for each channel between the active audio band communication and the inactive audio band communication and gain level is adjusted each time separately for on-hook and off-hook states so that gain level at each time in the time domain does not affect the gain level at other times in the time domain.

22. The data communication apparatus according to claim 21, wherein the data communication is the ADSL data communication of discrete multitone modem type, and the apparatus is an ADSL communication modem.

23. The data communication apparatus according to claim 21, wherein said detection unit detects whether or not the audio band communication is being conducted based on a detected dc voltage level of said telephone line.

24. The data communication apparatus according to claim 21, wherein said inactive audio band communication conducted by said communication unit uses up to the neighborhood interfering with an operating band of said audio band communication.

25. A data communication apparatus which can conduct data communication using the telephone line for audio band communication, comprising:

a detection unit for detecting whether the audio band communication is being conducted on said telephone line; and a communication unit for conducting, based on the detection output of said detection unit, the data communication using a predetermined band not interfering with the audio band communication in active audio band communication mode, and the data communication using up to the neighborhood of the audio band in the inactive audio band communication mode, said communication unit including, only on the transmission side, a filter for removing the frequency band of the ring tone signal for transmitting the request for the audio band communication to the receiving end.

26. The data communication apparatus according to claim 25, wherein the data communication is the ADSL data communication of discrete multitone modem type, and the apparatus is an ADSL communication modem.

27. A data communication apparatus which conducts data communication using a telephone line for audio band communication comprising:

a detection unit which detects whether the audio band communication is being conducted on said telephone line; and a communication unit which conducts data communication through said telephone line using an operating band, wherein said operating band does not interfere with audio band communication when said detection unit detects that audio band communication is being conducted, and said operating band being shifted or expanded up to the neighborhood of the audio band interfering with said audio band communication when said detection unit detects that audio band communication is not being conducted, wherein said operating band is expanded up to the audio band of 4 kHz when said detection unit detects that audio band communication is not being conducted, and wherein said communication unit includes a filter in a transmission side for removing the frequency band of the ring tone signal for transmitting the request for the audio band communication to the receiving end.

\* \* \* \* \*